United States Patent [19]

Doerfel et al.

[11]  4,049,638
[45]  Sept. 20, 1977

[54] MANUFACTURE OF POLYLACTAMS WITH INITIAL PRESSURES ABOVE VAPOR PRESSURES OF STARTING MATERIALS

[75] Inventors: Helmut Doerfel, Heidelberg; Claus Cordes, Weisenheim, both of Germany

[73] Assignee: BASF Aktiengesellschaft, Ludwigshafen, Germany

[21] Appl. No.: 609,693

[22] Filed: Sept. 2, 1975

[30] Foreign Application Priority Data

Sept. 12, 1976 Germany ............................ 2443566

[51] Int. Cl.$^2$ .............................................. C08G 69/16
[52] U.S. Cl. ............................... 260/78 L; 260/78 A; 526/65
[58] Field of Search ............................ 260/78 L, 78 R

[56] References Cited

U.S. PATENT DOCUMENTS

| | | | |
|---|---|---|---|
| 3,171,829 | 3/1965 | Wiesner et al. | 260/78 L |
| 3,317,482 | 5/1967 | Kunde et al. | 260/78 L |
| 3,458,482 | 7/1969 | Goto et al. | 260/78 L |
| 3,558,567 | 1/1971 | Twilley et al. | 260/78 L |
| 3,565,866 | 2/1971 | Guenther et al. | 260/78 L |

Primary Examiner—Harold D. Anderson
Attorney, Agent, or Firm—Keil, Thompson & Shurtleff

[57] ABSTRACT

A process for continuous production of polyamides by continuous transport of a mixture of one or more lactams and from 1 to 15% and preferably from 3 to 8% of water and optionally other polyamide-forming compounds such as the salts of dicarboxylic acids and diamines or aminocarboxylic acids through a number of reaction zones under polyamide-forming conditions, said mixture of starting materials being heated in a first reaction zone to temperatures of from 210° to 330° C and preferably from 220° to 280° C, whereupon the polycondensation mixture is adiabatically vented in a further reaction zone and is then polymerized to completion in yet another reaction state to form high molecular weight polyamides. The process is characterized in that a. the mixture of starting materials is heated in the first reaction zone at pressures which are above the respective vapor pressures of the starting materials and prevent the formation of a vapor phase, said heating being effected for from 5 minutes to 2 hours and preferably from 10 minutes to 1 hour until a conversion of at least 70% and preferably 80% has been reached;

b. the polycondensation mixture is vented in the second zone to pressures of from 1 to 11 bars and preferably from 1 to 6 bars and is then immediately heated in a third reaction zone, preferably together with the steam formed during adiabatic venting, with the application of heat and evaporation of the major portion of the water at the said pressure obtained by venting or a lower pressure, said heating being carried out for less than 10 minutes and preferably less than 5 minutes at temperatures of from 250° to 350° C and preferably from 260° to 280° C, whereupon c. the polymerization mixture is separated from the steam in a fourth reaction zone and is polymerized to completion in a further reaction stage to form high molecular weight polyamides.

13 Claims, No Drawings

MANUFACTURE OF POLYLACTAMS WITH INITIAL PRESSURES ABOVE VAPOR PRESSURES OF STARTING MATERIALS

This invention relates to an improved process for continuous production of polyamides by continuous transport of a mixture of one or more lactams and water and optionally other polyamide-forming substances such as the salts of diamines and dicarboxylic acids and/or aminocarboxylic acids and other additives such as viscosity controllers and pigments, under polyamide-forming conditions.

A relatively large number of processes and apparatus for the polycondensation of lactams are known. The majority of these processes are operated at atmospheric pressure by the so-called VK-tube method. Operating at atmospheric pressure it is generally necessary to use polycondensation times of from 20 to 40 hours at polyamide-forming temperatures of from 250° to 270° C. The drawbacks of this process are that it is in some cases necessary to use catalysts such as AH-salt and ε-aminocaproic acid and that the starting materials are subjected to a long period of thermal stress. This is particularly detrimental when sensitive lactams or thermally sensitive additives are used. Such processes have the further disadvantage that long intermediate runs are necessary for switching from one product to another, which runs cannot usually be economically exploited. A number of processes have also been described in which lactams, particularly caprolactams, are polycondensed in a first stage in the presence of water and under superatmospheric pressure. In a second phase, the pressure on the water is released and post-condensation is carried out at atmospheric pressure to complete polymerization of the polycondensation mixture.

For example, in East German Pat. No. 54,809 a 3-stage reactor for polymerizing caprolactam is described in which the first stage consists of a vertical tube provided with a paddle-gate stirrer and optionally having an outlet for steam at its top end, and in which the second stage consists of a so-called drier for allowing the steam to escape from the polycondensation mixture, and the third stage consists of a further vertical tube having a sweeping helical stirrer in which the polycondensation mixture is polymerized to completion.

East German Pat. No. 10,966 also describes a process for the production of polyamides, in which polyamides are precondensed from diamines and dicarboxylic acids in an autoclave in the presence of water, for example by heating to 220° C, whereupon the mixture is continuously flashed in a VK-tube in which the residence time is 10 hours.

Finally, U.S. Pat. No. 3,171,829 describes a three-stage process for the continuous polycondensation of caprolactam, in which all three reactors are stirred vessels filled to an extent of from two-thirds to four-fifths.

The disadvantage of this process is that in all three stages it is necessary to use complicated stirred reactors with means for maintaining the level of liquid in each reactor and pumps for agitating the polycondensation mixture whilst maintaining said liquid level and that in spite of this expense it is still necessary to effect polycondensation for from 7.7 to 10.9 hours and the product discharged from the reactor still contains from 14 to 20% of monomeric portions. The use of reactors having moving parts is also the drawback of the polycondensation apparatus proposed by East German Pat. No. 54,809. This patent describes a rotating paddle-gate stirrer in the first reactor and a sweeping rotating helical stirrer in the reactor used for post-condensation.

We have now found, surprisingly, that lactams and in particular caprolactam may be polycondensed in a much simpler manner and over brief periods using polycondensation apparatus having no moving parts or only one moving part in the reactors.

The invention is based on a process for the continuous production of polyamides by continuous movement of a mixture of one or more lactams and from 1 to 15% of water and optionally other polyamide-forming compounds, in which the mixture of starting materials is heated in a first reaction zone to temperatures of from 210° to 330° C and in which the pressure on the polycondensation mixture is released adiabatically in a further reaction zone, which polycondensation mixture is then polymerized to completion in further reaction stages to form high molecular weight polyamides. Our process is characterized in that in said procedure (a) the mixture of starting materials is heated in the first reaction zone at pressures which are above the respective vapor pressures of the starting materials and which prevent the formation of a vapor phase, for from 5 minutes to 2 hours and preferably from 10 minutes to 1 hour until a conversion of at least 70% and preferably of at least 80% has been obtained;

b. the pressure on the polycondensation mixture is released in the second zone to a value of from 1 to 11 bars and preferably from 1 to 6 bars, whereupon said polycondensation mixture is immediately heated in a third reaction zone, preferably together with the steam formed during said adiabatic flashing, to temperatures of from 250° to 350° C and preferably from 260° to 280° C for less than 10 minutes and preferably less than 5 minutes with the application of heat and evaporation of the major proportion of the water at the flashing pressure or a lower pressure, and c. the polymerization mixture is separated from the steam in a fourth reaction zone and is polymerized to completion in further reaction stages to form high molecular weight polyamides.

The process of the inventions carried out, e.g. by continuously conveying the mixture of lactam and from 1to 15% of water from a storage vessel by means of a pump via a heat exchanger into the vertical precondensation reactor, through which it passes as a plug flow over, say, 1 hour. The precondensation reactor is under a pressure which is above the vapor pressure of the reactants and is thus always completely filled with liquid. This is advantageous, since the formation of gas cushions would cause the flow to pulsate and thus lead to uneven polymerization. The precondensaton reactor is operated, e.g. at temperatures of from 220° to 280° C and pressures of 20 to 40 bars. The precondensate, which is polymerized to an extent of at least 70%, is adiabatically flashed, advantageously via a valve, into a distributor tube maintained under pressure of from 1 to 11 bars. The precondensate and flashed steam then pass through a tubular evaporator, in which the residual water is evaporated whilst the precondensate is heated to temperatures of 250° to 300° C. In the fourth reaction stage, steam and some monomeric lactam are separated from the polycondensation mixture. The polycondensation mixture is then preferably passed downwardly through a long vertical reaction vessel to be discharged at the bottom, e.g. by means of a gear pump, and extruded in the form of molten ropes which are then quenched in a water bath and granulated.

In another advantageous embodiment, use is made of a VK-tube, as conventionally used for the polymerization of caprolactam, particularly as described in German Published Application No. 1,495,198, as the fourth and fifth reaction zones in the process of the invention. The special advantage of this embodiment is that polymerization may be effected in said VK-tubes over much shorter residence times than hitherto, thus giving products showing a lower degree of damage.

In a special embodiment of the process of the invention, the residence time of the polymerization mixture in the fourth reaction zone, following separation of the steam, is from 0.5 to 2 hours. The temperature of the molten material is maintained at substantially that of zone three and the pressure is held at from 0.9 to 1.2 bars. Advantageously, the melt may be stirred in this reaction zone. The product is then condensed to completion in a fifth reaction zone, through which it passes substantially as plug flow, with the removal of heat, the residence time being from 0.25 to 5 hours and preferably from 0.5 to 2 hours at temperatures of from 220° to 300° C and preferably from 240° to 265° C.

In a preferred embodiment of the process, the polycondensation mixture is passed, in the first reaction zone, upwardly through a vertical reactor such that no gas space is formed. Advantageously, substantially plug flow is maintained in the first reaction zone, for example by means of suitable baffles.

Heating of the adiabatically flashed polycondensation mixture is preferably effected in a heat exchanger consisting of parallel heat exchanger elements.

The process of the invention constitutes a preferred method of polymerization lactams which are difficult to polymerize, e.g. ω-lauryllactam. It is a particular advantage that such lactams, e.g. ωlauryllactam, may be polymerized in the process of the invention in VK-tubes and without the addition of catalysts.

When polymerizing ε-caprolactam by the process of the invention it is advantageous to use temperatures of not more than 290° C.

The special advantages of the process of the invention over prior art processes reside, inter alia, in the short residence time during which the polycondensation mixture is subjected to high temperatures. The process may be carried out in reactors having no or only one simple stirring means, i.e. reactors having no potentially troublesome moving parts. The short polycondensation times also make it possible to include thermally sensitive additives, e.g. dyes and processing auxiliaries (e.g. lubricants based on esters), in the polycondensation mixture to form polymerized units therein.

One particular advantage of the process of the invention may be seen in the fact that the polymerization requires no use of catalysts which are not readily available, must be separated, or impair the properties of the products.

EXAMPLE 1

A mixture of 100 kg of ε-caprolactam and 7 kg of water is heated in a heat exchanger to 280° C at a feed rate of 51 kg/hr and is pumped upwardly into a vertical reaction tube having a capacity of 45 liters. The reaction tube is maintained at a temperature of 280° C and the pressure in the tube is held at 40 bars. The product leaving at the top of the reaction tube is converted to an extent of 85%. The product is then passed through a cascade-connected tubular heat exchanger.

This heat exchanger is heated such that the temperature of the product at its outlet is from 288° to 290° C. On leaving said heat exchanger, the reaction mixture passes to a stirred vessel heated at from 288° to 290° C. In this vessel, the steam formed is separated off and a pressure of 1.02 bars is maintained. The rate of discharge of the melt from the tubular vessel is adjusted by means of a pump such that the vessel is always filled to an extent of 70 kg. The pump-discharged product is passed downwardly through a vertical reaction tube. This reaction tube is provided with baffles such as to produce a plug flow as far as possible. Built-in heat exchangers cause the temperature of the molten material to fall from 288° at the inlet of the reaction tube to 272° C at the outlet thereof. Following a residence time of 1.7 hours in the reaction tube, the product is discharged at the bottom and has a K-value of 70. The residual extract is 12%.

If the temperature of the melt passing through the reaction tube is lowered from 288° at the inlet to 269° C at the outlet of the tube, there is produced, after a residence time in the reaction tube of 2.6 hours, a product having a K-value of 71.3, the residual extract being 11.4%.

EXAMPLE 2

A mixture of 100 kg of ε-caprolactam and 7 kg of water is passed at a feed rate of 71 liters/hr to a heat exchanger, where it is heated to 290° C, whereupon it is passed upwardly through a vertical reaction tube having a capacity of 45 liters. The reaction tube is maintained at a temperature of 290° C, the pressure therein being held at 40 bars.

The product leaving the top of the reaction tube is converted to an extent of 78% and is then passed through a tubular heat exchanger to the top of a conventional VK-type as described in German Published Application No. 1,495,198.

The heat exchanger is heated so as to give a temperature of 285° C at the top of the VK-tube.

The volume of the tubular portion of the VK-tube is 200 liters and the volume of the head is 70 liters. The pressure in the head of the VK-tube is maintained at 1.03 bars and the temperature of the product in the VK-tube is lowered from 285° to 272° C.

The product discharged from the VK-tube has a K-value of 73.2 and a residual extract of 11.2%.

EXAMPLE 3

A mixture of 11.2 kg/hr of ε-caprolactam and 0.8 kg/hr of water is pumped through an oil-heated heat exchanger tube, which it leaves at a temperature of 270° C. The mixture passes at this temperature through the bottom of a vertical reaction tube having a capacity of 8 liters and heated at 270° C, where it is maintained at a pressure of 40 bars. The polycondensation mixture leaving the top of the reaction tube is flashed in a pressure-release valve to pass through a tubular heat exchanger and then downwardly through a long vessel having a capacity of 20 liters. The pressure in this vessel is maintained at 1.01 bars and its contents are held at 15 liters. The vessel is heated in such a manner that the temperature of the product is lowered by 10° C between the inlet and outlet of the vessel. The steam formed is withdrawn at the top of the vessel and the polymer at the bottom.

The tubular heat exchanger is heated in such a manner that the temperature of the product leaving it is 260° C in case (a) and 290° C in case (b).

In case (a) there is obtained a product having a K-value of 64 and in case (b) one having a K-value of 62. In both cases, the amount of extractables in the product is between 10 and 11%.

EXAMPLE 4

A mixture of 100 kg of ε-caprolactam and 4 kg. of water is passed at a feed rate of 30 liters/hr to a heat exchanger, where it is heated to 270° C and from which it is pumped upwardly through a vertical reacton tube having a capacity of 45 liters. The temperature in the reaction tube is held at 270° C and the pressure at 40 bars. The product leaving the top of the reaction tube is converted to an extent of 75% . It is passed through cascade-connected tubular heat exchanger and then to a stirred vessel. The heat exchanger is heated in such a manner that the temperature of the product in the stirred vessel is 278° C.

The pressure in the stirred vessel is maintained at 1.01 bar and the product is pumped from the stirred vessel at such a rate that the volume of the contents in said vessel remains at 70 liters. The product discharged has a K-value of 68.5 and contains 11% of residual extract.

In all cases, the K-value was determined by the method described by H. Fikentscher using 1% solutions in 96% sulfuric acid.

We claim:

1. A process for the continuous production of a solid polyamide by continuously transporting a mixture of one or more lactams and from 1 to 15% based on lactam of water through a number of successive reaction zones under polyamide-forming conditions, which comprises:
   a. heating the mixture of starting materials in the first reaction zone to a temperature of from 210° to 330° C at minimum pressures of at least 20 atm. and which pressures are above the respective vapor pressures of the starting materials and prevent the formation of a vapor phase in said first reaction zone, said heating being effected for from 5 minutes to 2 hours until the polymerizable mixture has been polymerized to a conversion of at least 70%, but not to completion, said polymerizable mixture occuring in said first reaction zone under plug flow conditions, and transferring said polymerizable mixture to a next zone;
   b. adiabatically reducing the pressure of the polymerizable mixture in the second zone to pressures of from 1 to 11 atm and then transferring to and immediately heating in a third reaction zone, with the application of heat and evaporation of the major portion of the water at the said pressure obtained by pressure reduction or at a pressure which is lower than said pressure, said heating being carried out for less than 10 minutes but long enough to ensure evaporation of the major portion of the water at temperatures of from 250° to 350° C, and transferring the polymerizable mixture to a next zone;
   c. separating the polymerization mixture from the steam in a fourth reaction zone and polymerizing to completion in a further reaction stage to increase the molecular weight of the solid polyamide.

2. A process as set forth in claim 1, wherein the polymerization mixture in the fourth reaction zone following separation of the steam is held at a pressure of from 0.9 to 1.2 atm for from 0.5 to 2 hours without the application of heat, whereupon it is passed to a fifth reaction zone, where it is maintained at temperatures of from 220° to 300° C for from 0.25 to 5 hours with the removal of heat whilst moving substantially in the form of plug flow.

3. A process as set forth in claim 1, wherein the polymerization mixture following separation of the water in the fourth reaction zone is passed through a fifth reaction zone substantially in the form of plug flow with the removal of heat, to be maintained at temperatures of from 220° to 300° C for from 0.25 to 5 hours.

4. A process as set forth in claim 1, wherein the polymerization mixture following the separation of the water in the fourth reaction zone is maintained in said reaction zone at a pressure of from 0.9 to 1.2 atm without the application of heat and with stirring for from 1 to 4 hours.

5. A process as set forth in claim 1, wherein the lactam used is ε-caprolactam.

6. A process as set forth in claim 1, wherein the lactam used is ω-lauryllactam.

7. A process as set forth in claim 1, wherein the mixture of lactams and water contains from 3 to 8% by weight water.

8. A process as set forth in claim 1, wherein the mixture of starting materials in the first reaction zone is heated to temperatures of from 220° to 280° C.

9. A process as set forth in claim 1, wherein the mixture of starting materials is heated for from 10 minutes to 1 hour.

10. A process as set forth in claim 1, wherein the conversion in the first reaction zone is at least 80%.

11. A process as set forth in claim 1, wherein the pressure in the second zone is from 1 to 6 atm.

12. A process as set forth in claim 1, wherein the polymerizable mixture in the third zone is heated together with the steam formed during adiabatic pressure reduction.

13. A process as set forth in claim 1, wherein the heating in the third reaction zone is carried out for less than 5 minutes at temperatures of from 260° to 280° C.

* * * * *